(12) United States Patent
Swearingen et al.

(10) Patent No.: US 7,097,135 B2
(45) Date of Patent: Aug. 29, 2006

(54) AIRSHIP

(75) Inventors: Steven Swearingen, Shelton, WA (US); Therin Laney, Shelton, WA (US)

(73) Assignee: Windcrafter, Inc., Olympia, WA (US)

( * ) Notice: Subject to any disclaimer, the term of this patent is extended or adjusted under 35 U.S.C. 154(b) by 0 days.

(21) Appl. No.: 11/027,746

(22) Filed: Dec. 30, 2004

(65) Prior Publication Data

US 2005/0279881 A1    Dec. 22, 2005

Related U.S. Application Data

(63) Continuation of application No. 10/389,014, filed on Mar. 12, 2003, now Pat. No. 6,837,458.

(51) Int. Cl.
*B64B 1/58* (2006.01)

(52) U.S. Cl. ....................... 244/30; 244/128
(58) Field of Classification Search .......... 244/24, 244/30, 125, 128, 31
See application file for complete search history.

(56) References Cited

U.S. PATENT DOCUMENTS

| | | | |
|---|---|---|---|
| 1,004,662 A | 10/1911 | Kuenzel | |
| 1,045,337 A | 11/1912 | Spilka | |
| 1,241,623 A | 10/1917 | Gusey | |
| 1,337,032 A | 4/1920 | Appinel | |
| 1,340,053 A | 5/1920 | Janda | |
| 4,085,912 A | 4/1978 | Slater | |
| 5,678,783 A | 10/1997 | Wong | |
| 6,527,223 B1 | 3/2003 | Mondale | |

*Primary Examiner*—Peter M. Poon
*Assistant Examiner*—Timothy D. Collins
(74) *Attorney, Agent, or Firm*—Christensen O'Connor Johnson Kindness PLLC

(57) ABSTRACT

An airship (100) for conveyance through a fluid medium in a selected direction of travel. The airship includes a hull adapted to contain a lifting medium therein, wherein the hull (108) includes a first section having a width which varies along the selected direction of travel, the width increasing from a bow of the hull to a maximum width and decreasing from the maximum width to a tail section of the first section; and a second section coupled to the first section and having a width which varies along the selected direction of travel, the width increasing from a leading edge of the second section to a maximum width and decreasing from the maximum width to a stern of the hull.

15 Claims, 6 Drawing Sheets

AIRSHIP

CROSS-REFERENCE TO RELATED APPLICATION

This application is a continuation of application Ser. No. 10/389,014, filed Mar. 12, 2003, now U.S. Pat. No. 6,837,458, issued on Jan. 4, 2005, the disclosure of which is hereby expressly incorporated by reference.

FIELD OF THE INVENTION

The present invention pertains to airships, and more particularly, to airships utilizing a lifting gas as a lifting source.

BACKGROUND OF THE INVENTION

Airships have long been known and used as a means of conveyance, surveillance, and entertainment. In one common form of an airship, an elongate ellipsoidal shaped bladder is used to suspend a gondola housing crew, equipment, etc., thereunder. This airship is a non-rigid lighter than air craft commonly referred to as a "blimp." Although previously developed airships are effective in accomplishing their intended purpose, they are not without their problems. For instance, in ellipsoidal airships, many attachment mechanisms are coupled to the exterior of the ellipsoidal lift bladder to couple the lifting force of the bladder to the gondola. These attachment mechanism increase the drag of the airship, thus decreasing its efficiency.

Further, propulsion sources are exposed to the main air stream, thus increasing drag. Further still, the airship has a horizontally oriented lifting bladder defining a large footprint. Such a large footprint increases storage costs and the potential for an accident, as well as increasing landing and takeoff area space requirements. Inasmuch as the lifting bag is horizontally oriented, large forces are required to turn the airship since the horizontal arrangement of the lifting bladder increases the moment of inertia of the airship about a vertical axis. Thus, larger control surfaces, which develop large amounts of drag, are needed. Further, steerage is sluggish due to the large moment of inertia.

In the ellipsoidal airship, altitude changes are instigated by manipulating the pitch of the airship. For instance, to rise in altitude, the bow of the airship is elevated relative to the stern, thus providing a tilted attitude of the airship, causing an awkward and uncomfortable environment onboard the airship. Ellipsoidal airships also use semi-rigid to rigid lift bladder designs that are heavy and expensive, wherein loss of balloon pressure often causes severe safety issues. Further, the propulsion sources are often located adjacent to or attached to the gondola. This causes significant safety concerns for manned gondolas, and exposes any occupants to unpleasant noise and vibration.

Also, in ellipsoidal airships, the outer skin is typically laminated to enhance the rigidity of the outer skin and to aid in retaining the lifting gas therein. This results in a heavy and expensive outer skin. Further still, previously developed airships only use a single lifting bladder, causing significant safety issues should the single lifting bladder become punctured. Further, the breakdown of the airship requires the dumping of the lifting gas from the lifting bladder, since the lifting bladder is non-removably attached to the gondola. Also, if the propulsion fails in the previously developed ellipsoidal airship, steerage is lost and the airship will drift at the whims of the wind, an inherently dangerous situation.

SUMMARY OF THE INVENTION

An airship for conveyance through a fluid medium in a selected direction of travel is provided. The airship includes a hull adapted to contain a lifting medium therein. The hull includes a first section having a width which varies along the selected direction of travel, the width increasing from a bow of the hull to a maximum width and decreasing from the maximum width to a tail section of the first section. The hull also includes a second section coupled to the first section and having a width which varies along the selected direction of travel, the width increasing from a leading edge of the second section to a maximum width and decreasing from the maximum width to a stern of the hull.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
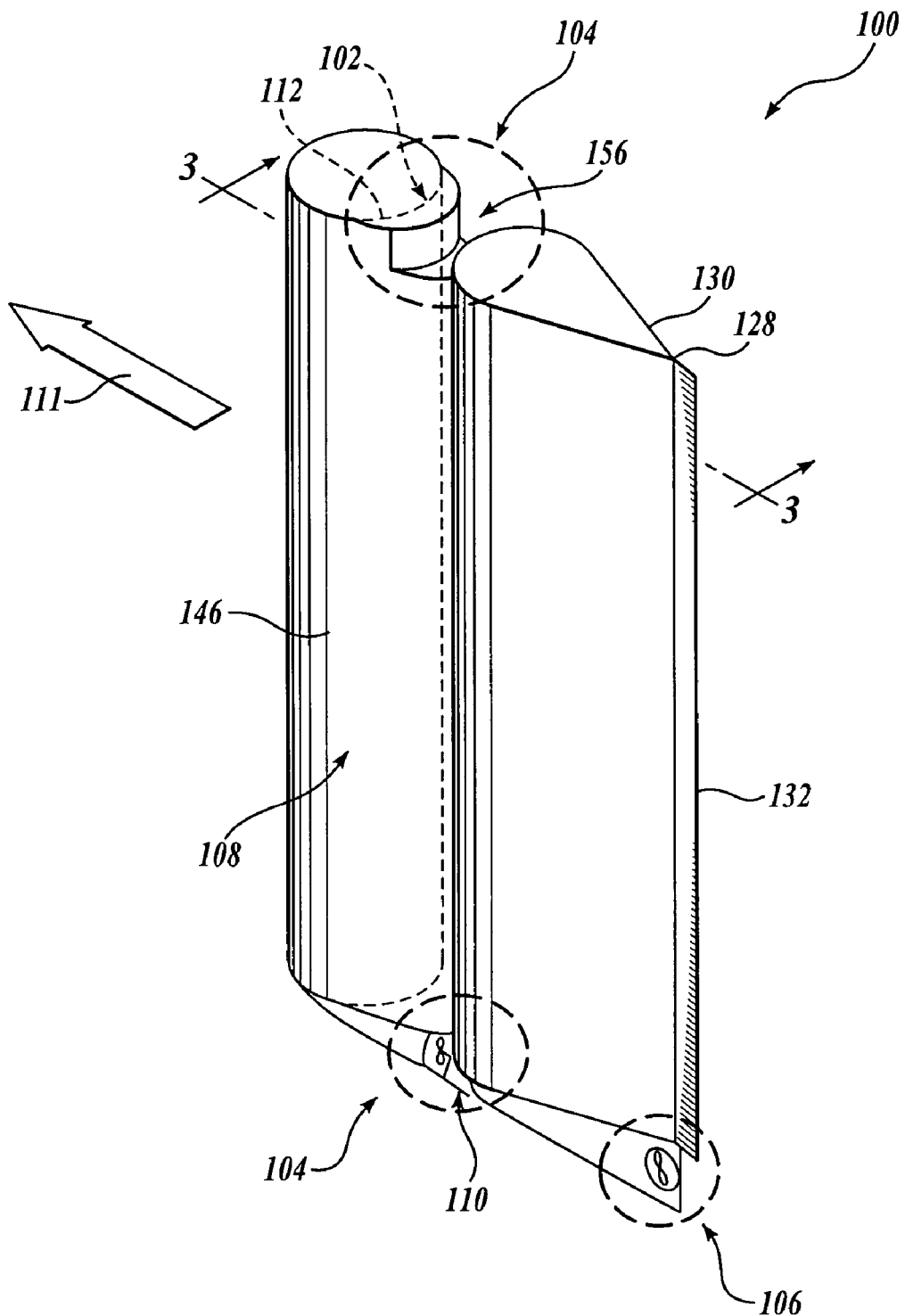
FIG. 1 is a perspective view of one embodiment of an airship formed in accordance with one embodiment of the present invention.

FIGS. 1–6 illustrate an airship 100 formed in accordance with one embodiment of the present invention. Referring to FIG. 1, the airship 100 generally includes a lift assembly 102, a propulsion system 104, a control system 106, a hull 108, and a structural frame 110. The lift assembly 102 includes a plurality of lift bladders 112 coupled to the structural frame 110 and covered by an outer skin 146 to form the hull 108. The lift bladders 112 are filled with a suitable lifting gas, such as helium, hot air, a partial vacuum, etc., to provide sufficient lift to the airship 100. The propulsion and control systems 104 and 106 allow the airship 100 to be selectively maneuvered by either a remote or onboard user, all of which will be described in further detail below. The preferred direction of travel is indicated by an arrow identified by reference numeral 111.

Figure 2:
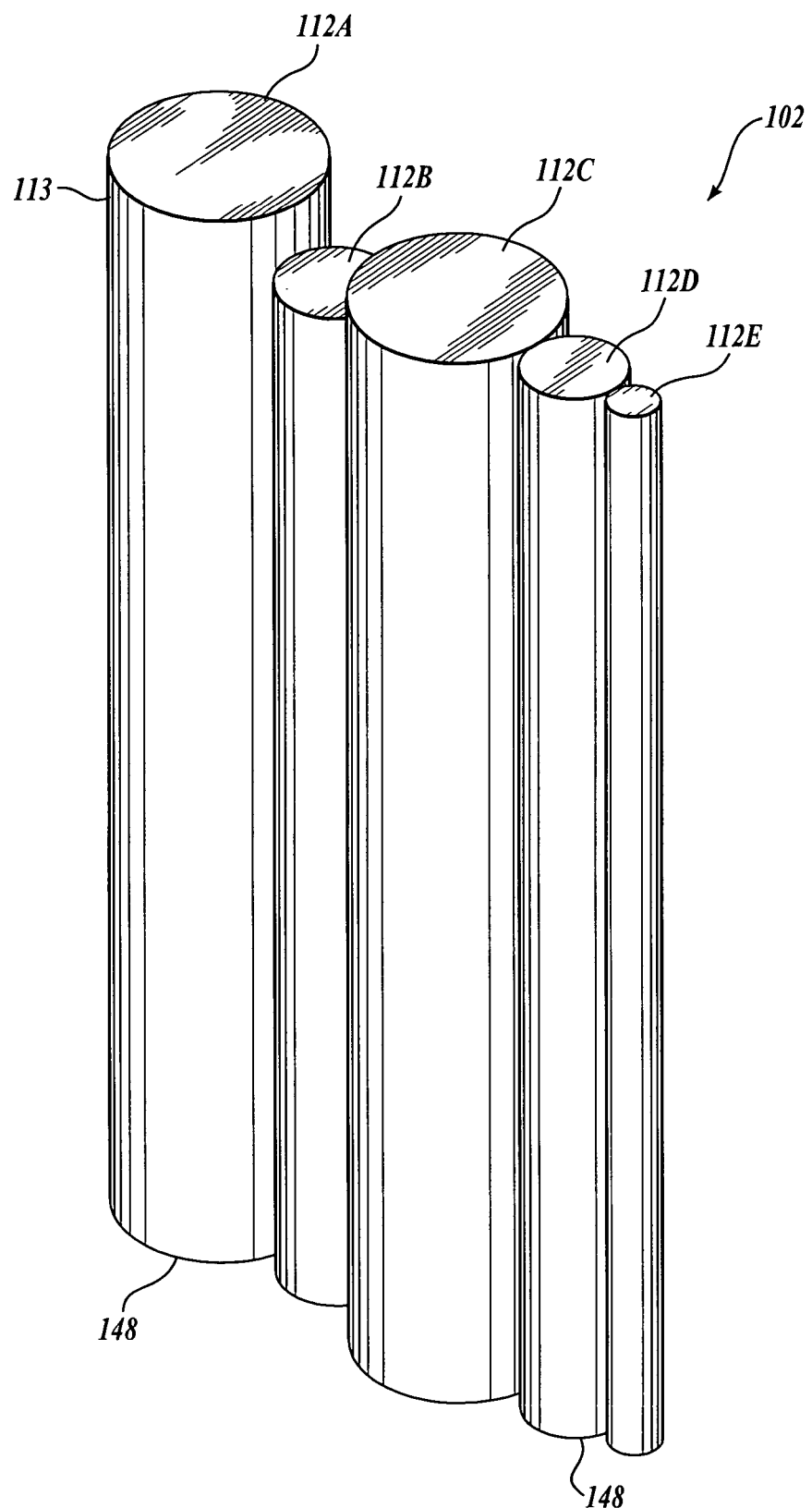
FIG. 2 is a perspective view of a series of lift bladders suitable for use in the airship depicted in FIG. 1.

Referring to FIGS. 1 and 2, the lifting assembly 102 includes a plurality of lift bladders 112. In the illustrated embodiment, five lift bladders 112A, 112B, 112C, 112D, and 112E are utilized. Each lift bladder 112 includes an outer skin 113 defining an elongate hollow cylindrical inner cavity adapted to receive a suitable lifting gas therein. The outer skin 113 of each of the illustrated lift bladders 112 is formed from a flexible material resistant to lifting gas migration therethrough, such as synthetic fabrics, one suitable example being a polyester film sold under the trademark MYLAR®, manufactured by DuPont Teijin Films, U.S. Limited Partnership, Barley Mill Plaza, Bldg. 27, Lancaster Pike &

Route 141, P.O. Box 80027, Wilmington, Del. 19880-0027, USA. The fabric may be metalized to improve gas retention within the lift bladder 112.

The height and width of each lift bladder 112 is selected to provide a desired lifting force to the airship. More specifically, for a greater lifting force, i.e. cargo carrying capacity, lift bladders 112 having increased heights and/or widths are selected. Moreover, by increasing the heights and/or widths of the lift bladders 112, the lifting gas carrying capacity of the lift bladders 112 is increased, causing a resultant increase in the cargo carrying capacity of the lifting bladders 112.

Figure 3:
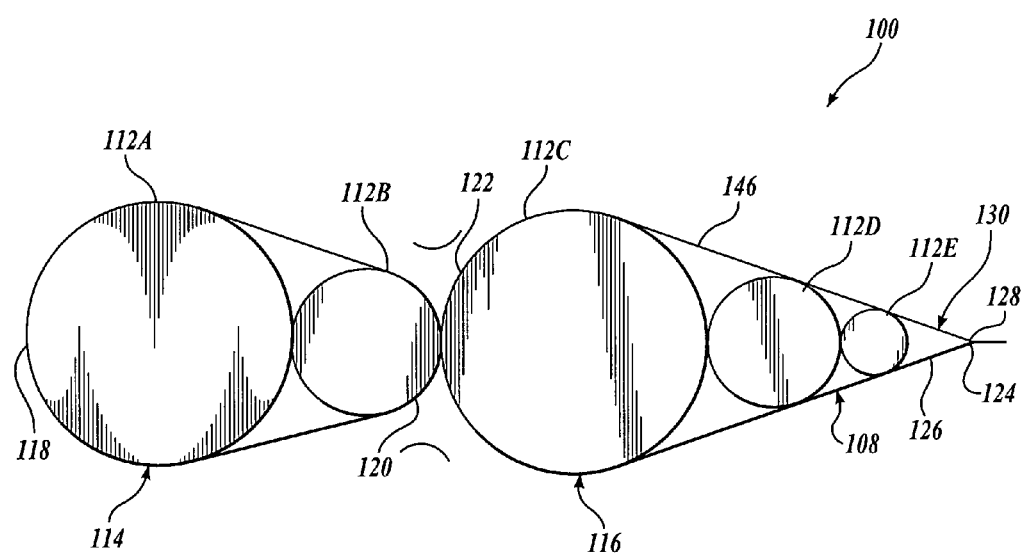
FIG. 3 is a cross-sectional view of the airship depicted in FIG. 1 the cross-sectional cut taken through Section 3—3 of FIG. 1.

Referring now to FIG. 3, the diameters of each of the lift bladders 112 are sized to assist in providing an advantageous shape to the hull 108 of the airship 100. More specifically, the hull 108 of the airship 100 is shaped to resemble a carangifoil adapted for carangiform locomotion. The hull 108 includes a leading section 114 substantially formed by lift bladders 112A and 112B, and a trailing section 116, substantially formed by lift bladders 112C, 112D, and 112E. The leading section 114 has a blunt or rounded nose 118 defined by the curvature of lift bladder 112A and a rounded trailing edge 120 defined by the curvature of lift bladder 112B. The trailing section 116 has a rounded nose 122 defined by the curvature of lift bladder 112C, and a pointed trailing edge 124 defined by a tail section 126, the shape of the tail section 126 defined by the structural frame as will be discussed in further detail below.

The shape of the airship 100 is thus formed by selectively choosing the diameters of each lift bladder 112. More specifically, it has been found that the leading lift bladders 112A and 112C of each leading section 114 and 116 may have a suitable diameter that may be determined by dividing the height of lift bladder 112A or 112C by a number between about 3.3 and about 6.7, with a preferred value of approximately 5.

A suitable diameter for lift bladder 112D may be determined by dividing the diameter of lift bladder 112A or 112C by a number equal to about 2. A suitable diameter for lift bladder 112E may be determined by dividing the diameter of lift bladder 112A or 112C by a number equal to about four.

The diameter of lift bladder 112B may be selected depending on the desired handling characteristics of the airship. Moreover, it has been found that by decreasing the diameter of lift bladder 112B, the handling characteristics of the airship 100 can be improved, however, due to the smaller diameter of lift bladder 112B, the lifting capacity of the airship 100 is decreased. Likewise, by increasing the diameter of lift bladder 112B, the handling characteristics of the airship 100 are slightly decreased, however the lifting capacity of the airship 100 is increased.

More specifically, for the preferred embodiment, a suitable diameter of lift bladder 112B may be approximated by taking the diameter of lift bladder 112D and adding about one to about three inches, with a preferred diameter selected by adding about two inches to the diameter of lift bladder 112D. Alternately, the width of the second bladder may be calculated by multiplying the width of the first bladder by a number between about 0.4 and 0.6, with a preferred value of 0.5, and adding about one to three inches, with a preferred value of two inches.

For increased lift, at the price of a slight decline in maneuverability, the diameter of lift bladder 112B may be approximated by multiplying the diameter of lift bladder 112E by a number between about 0.3 and about 0.7, with a preferred number of approximately 0.5, and adding the diameter of lift bladder 112B. Alternately, the width of the second bladder may be calculated by multiplying the width of the first bladder by a number between about 0.5 and 0.7, with a preferred value of 0.625.

For even further increased lift, at the price of a more pronounced decline in maneuverability, the diameter of lift bladder 112B may be approximated by taking the diameter of lift bladder 112D and adding the diameter of lift bladder 112E multiplied by a number between about 0.7 and 1.3, with a preferred value of 1. Alternately, the width of the second bladder may be calculated by multiplying the width of the first bladder by a number between about 0.6 and about 0.9, with a preferred value of 0.75.

Adjacent and aft of lift bladder 112E is the tail section 126. The tail section 126 in the illustrated embodiment is a non-buoyant compartment formed by the outer skin 146 engaging the structural frame of the airship 100. The tail section 126 is defined as the portion of the airship 100 extending aft of lift bladder 112E to the aft most structure of the stern 130 of the airship 100 (excluding any fin or rudder structures), which in the illustrated embodiment is a stern post 128. The longitudinal length of the tail section 126 is measured from the aft most portion of lift bladder 112E to the stern post 128. The longitudinal length of the tail section 126 is approximated by multiplying the diameter of lift bladder 112E by a number between about 0.5 and about 1.5, with a preferred value of about 1 (wherein the longitudinal length of the tail section 126 equals the diameter of lift bladder 112E.)

Figure 5:
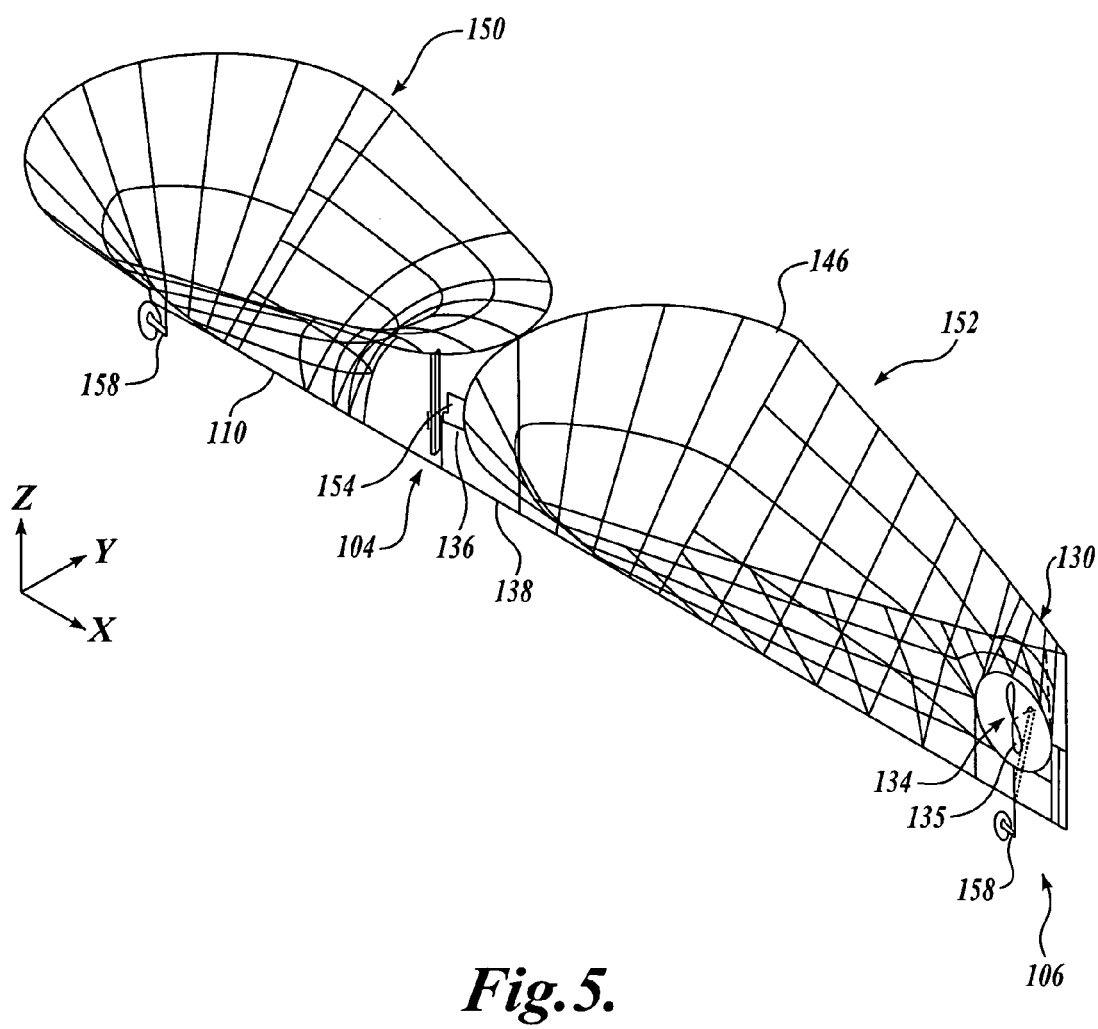
FIG. 5 is a perspective schematic of the lower portion of the covering depicted in FIG. 4 showing first and second enclosed spaces.

Referring to FIGS. 1 and 5, the detailed description will now focus upon the control system 106. The control system 106 includes an optional tail fin 132, optional spinner thruster 134, and the propulsion system 104. The tail fin 132 is pivotally coupled to the structural frame 110 at the stern 130 of the airship 100 adjacent to the stern post 128. The tail fin 132 is rotatable about a vertically oriented axis to selectively control the yaw of the airship 100. In the illustrated embodiment, the tail fin 132 is of about the same height as lift bladder 112E. The width of a suitable tail fin 132 may be approximated by dividing the diameter of lift bladder 112E by a number between about 1.5 and about 2.5, with a preferred number of about 2. The operation of the tail fin 132 is well known in the art and substantially identical to that of a rudder of a waterborne ship or airplane, and therefore will not be described further herein for the sake of brevity.

The control system 106 includes the spinner thruster 134. The spinner thruster 134 is operable to create side thrusts upon the airship 100 as to induce yaw, and to a lesser extent roll, to the airship. More specifically, the spinner thruster 134 is adapted to selectively create thrust oriented perpendicular to the centerline of the airship 100 by rotating a propeller 135 about an axis located perpendicular to the centerline of the airship 100. Inasmuch as the spinner thruster 134 is located in the stern 130 of the airship 100, any thrust produced by the spinner thruster 134 tends to rotate the airship 100 about a vertical axis passing through the center of mass of the airship 100. Thus, the spinner thruster 134 acts substantially similar to a stern thruster of a waterborne ship. Further, inasmuch as the spinner thruster 134 is located below a horizontal axis passing through the center of mass of the airship 100, any thrust produced by the spinner thruster 134 also tends to cause the airship 100 to roll. In the illustrated embodiment, the diameter of the spinner thruster 134 may be approximated as about the diameter of lift bladder 112E.

Although the spinner thruster 134 is located below a horizontal axis passing through the center of mass of the airship 100, it should be apparent to those skilled in the art that the spinner thruster 134 may be located in alternate locations. For instance, the spinner thruster 134 may be located above or on the horizontal axis passing through the center of mass of the airship 100.

Further, the spinner thruster 134 in the illustrated embodiment may be pivotally coupled to the structural frame 110 of the airship 100 to allow the thrust axis of the spinner thruster 134 to be selectively oriented relative to the airship 100. Moreover, the spinner thruster 134 is coupled to the airship 100 by a gimbal 155, such that the spinner thruster 134 may rotate about at least one axis of rotation. In the illustrated embodiment, the spinner thruster 134 is gimbaled so as to rotate about a first axis located parallel to the centerline of the airship 100. Thus, the thrust axis of the spinner thruster 134 may be selectively oriented to provide side thrust (i.e. left or right thrust), lift thrust, and downward thrust, and combinations thereof. Alternately, the spinner thruster 134 may be gimbaled so as to rotate about a second axis located perpendicular to the first axis, such that the spinner thruster 134 may also provide forward thrust and reverse thrust.

The spinner thruster 134 and the tail fin 132 of the control system 106 both permit the airship 100 to turn. Thus, the spinner thruster 134 and the tail fin 132 are redundant in some sense, although it should be noted that the spinner thruster 134 may be used to turn the airship 100 even without the passage of air across the airship 100, wherein the tail fin 132 requires the passage of air across the airship 100 for operation. Thus, it should be apparent to those skilled in the art that either the spinner thruster 134 or the tail fin 132 may be eliminated without disabling the airship 100 from turning. Further, if turning is not a required characteristic of the airship 100, then both the spinner thruster 134 and the tail fin 132 may be eliminated.

The propulsion system 104 includes a propulsion source 136. The propulsion source 136 may be any well known propulsion source, a few suitable examples being an electrical or fuel powered propeller, or a jet, turbine, or rocket engine. The propulsion source 136 in the illustrated embodiment is pivotally coupled to the structural frame 110 of the airship 100 to allow the thrust axis of the propulsion source 136 to be selectively oriented relative to the airship 100. Moreover, the propulsion source 136 is coupled to the airship 100 by a gimbal 154, such that the propulsion source 136 may rotate about at least one axis of rotation. In the illustrated embodiment, the propulsion source 136 is gimbaled so as to rotate about a first axis located perpendicular to the centerline of the airship 100. Thus, the thrust axis of the propulsion source 136 may be selectively oriented to provide forward thrust, reverse thrust, lift thrust, and downward thrust, and combinations thereof.

Alternately, the propulsion source 136 may be gimbaled so as to rotated about a second axis located perpendicular to the first axis, such that the propulsion source 136 may also provide side thrust.

In the airship 100 of the illustrated embodiment, the propulsion source 136 may be located either below lift bladder 112B as shown in the illustrated embodiment, or above lift bladder 112B at a location indicated by reference numeral 156. Alternately, tandem propulsion sources may be utilized with a propulsion source positioned both below and above lift bladder 112B. If the propulsion source 136 is located above lift bladder 112B, lift bladder 112B is shortened in length approximately the diameter of lift bladder 112B to accommodate the propulsion source 136. More specifically, the height of lift bladder 112B is shortened such that the propulsion source 136 may be placed behind, and not above, lift bladder 112A, such that the propulsion source 136 is mounted in the slipstream behind lift bladder 112A to minimize drag.

The positioning of the propulsion source 136 in the upper location 156, and positioning of the spinner thruster 134 in an upper location, is preferred in instances wherein the airship 100 is designed to convey humans, as the upper location 156 may provide increased safety by removing the propulsion source from proximity to any occupants. Although specific locations of propulsions sources have been described for the illustrated embodiment, it should be apparent to those skilled in the art that alternate locations of the propulsion sources are within the spirit and scope of the present invention. The lower propulsion source 136 is preferably placed behind, and not below, a forward enclosed space 150 (which will be described in further detail below) such that the propulsion source 136 is mounted in the slipstream behind the forward enclosed space 150 to minimize drag.

Figure 6:
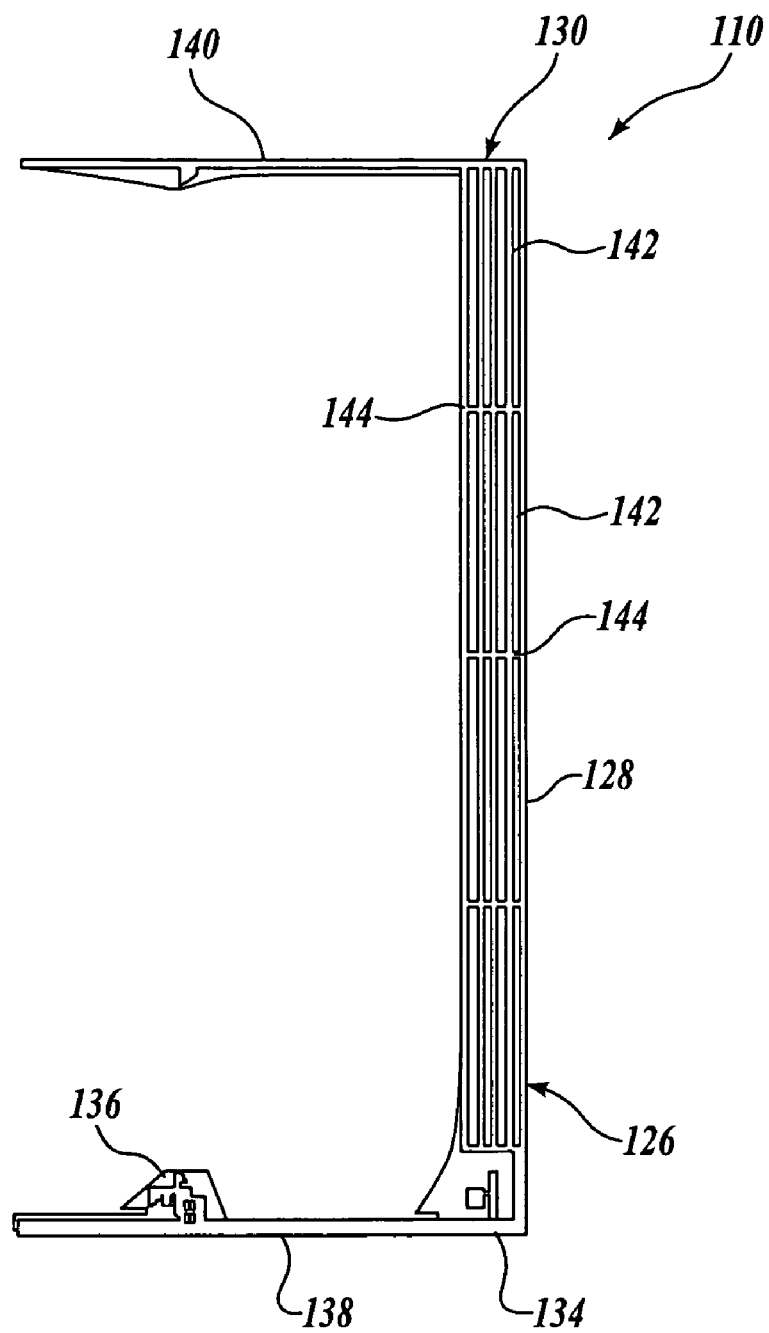
FIG. 6 is a side view of a structural frame suitable for use in the airship depicted in FIG. 1.

Referring now to FIG. 6 and focusing on the structural frame 110 of the airship, the structural frame 110 provides a skeletal framework to tie the various components of the airship 100 together. In the illustrated embodiment, the structural frame 110 includes a lower keel 138 and an upper keel 140 spaced from the lower keel 138. Both the lower and upper keels 138 and 140 are intersected by the centerline of the airship 100 and are oriented parallel to one another in a generally horizontal orientation. Extending between the lower and upper keels 138 and 140 are a plurality of vertically oriented frame members 142. The vertical frame members 142 are disposed in the stern 130 of the airship, and more particularly are disposed in the tail section 126 of the airship. The vertical members 142 are coupled to horizontally oriented stringers 144 to provide additional rigidity to the structural frame 110. The vertical members 142 and the stringers 144 provide the skeletal framework for forming of the shape of the tail section 126.

Referring to FIGS. 5 and 6, the upper and lower keels 138 and 140, in addition to providing rigidity to the airship 100, provide accessible and convenient locations for securing equipment thereto. For instance, in the illustrated embodiment, both the propulsion source 136 and the spinner thruster 134 are coupled to the lower keel 138. Likewise, if an upper propulsion source 136 is desired, the upper keel 140 provides a suitable mounting location for securing the propulsion source 136 and the spinner thruster 134 at a location elevated above the lower keel 138. Further, additional equipment or frame members may be mounted to the lower and upper keels 138 and 140 as desired. For instance, in the illustrated embodiment, a pair of landing wheels 158 are coupled to the lower keel 138 in proximity to the distal ends of the lower keel 138.

Figure 4:
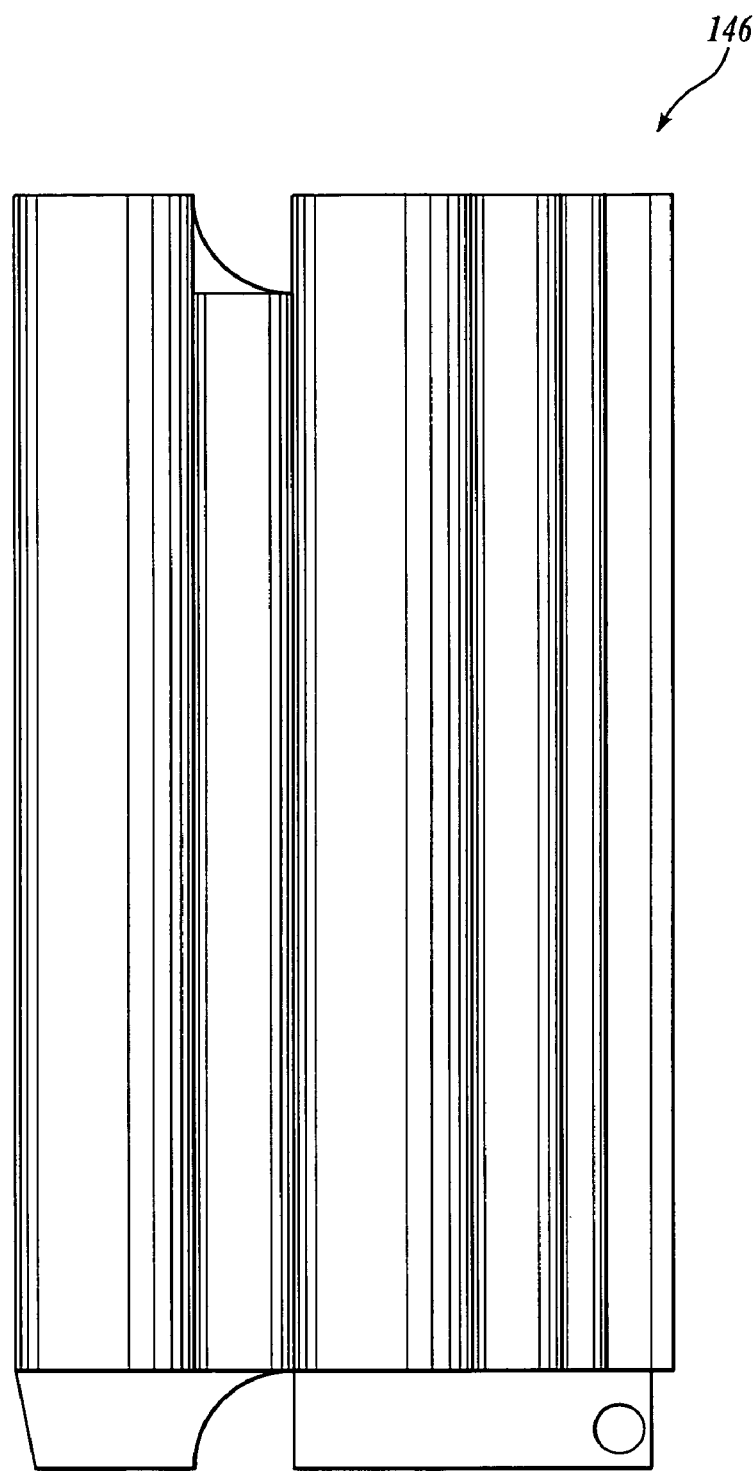
FIG. 4 is a schematic of an outer skin suitable to enshroud the lift bladders depicted in FIG. 2.

Referring to FIGS. 3–5, the detailed description will now focus upon the hull 108. The hull 108 is defined by an outer skin 146 that enshrouds the lift bladders 112. The outer skin 146 is formed from a flexible covering, such as an organic or synthetic fabric. In one working embodiment, the outer skin 146 is formed from rip-stop nylon.

The outer skin 146 enshrouds lift bladders 112A and 112B to form the forward or leading section 114, and enshrouds lift bladders 112C, 112D, and 112E, and the tail section 126, to form the trailing section 116. The outer skin 146 extends down from the lift bladders 112 and couples to the lower keel 138. A substantial portion or all of the lift generated by the lift bladders 112 is transferred to the outer skin 146, which then transfers the lift to the lower keel 138. The upper keel is attached to the upper portion (i.e. the top) of the outer skin 146. The upper keel may provide solely stability to the lift bladders 112, tying the top portions of the lift bladders 112 to the structural frame 110. Alternately, the upper keel may be designed to absorb a portion of or all of the lift generated by the lift bladders 112.

The outer skin 146 is further utilized to form substantially enclosed spaces directly underneath the lift bladders 112. More specifically, as stated above, the outer skin 146 extends down from the lift bladders 112 to the lower keel 138. Inasmuch as the lower keel 138 is spaced from the bottom end surfaces 148 (See FIG. 2) of the lift bladders 112, a forward enclosed space 150 and an aft enclosed space 152 are formed. The forward enclosed space 150 is defined by the outer skin 146, the bottom end surfaces 148 (See FIG. 2) of lift bladders 112A and 112B, and the lower keel 138. The aft enclosed space 152 is defined by the outer skin 146, the bottom end surfaces 148 of lift bladders 112C, 112D, and 112E, and the lower keel 138. The enclosed spaces 150 and 152 may be designed to accommodate equipment, cargo and/or passengers as desired by a user.

Although the illustrated embodiment depicts enclosed spaces located above the lower keel 138, it should be apparent to those skilled in the art that enclosed spaces may be located in other locations, such as below the lower keel 138, or above or below the upper keel 140. Further, although the illustrated embodiment depicts the enclosed spaces as having a specific shape, it should be apparent to those skilled in the art that the enclosed spaces may take alternate forms, such to be angled, flat, domed, or otherwise shaped to accommodate the needs of the end user.

Although the illustrated embodiment depicts an airship utilizing five lift bladders, it should be apparent to those skilled in the art that any number of lift bladders 112 may be used without departing from the spirit and scope of the present invention, including any number greater than one. Further, although the illustrated embodiment depicts the lift bladders as having a cylindrical shape, it should be apparent to those skilled in the art that the lift bladders may be shaped in other forms, such as a shape that more closely matches that of the shape of the hull, such that there is no void located between adjacent lift bladders, or such that the airship is substantially formed from a single lift bladder, the lift bladder closely matching the shape of the hull.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An airship for conveyance through a fluid medium, the airship comprising:
 (a) a hull adapted to contain a lifting medium therein, wherein the hull comprises:
  (i) a first section having a width which varies along an axis extending longitudinally through the hull, the width increasing from a bow of the hull to a maximum width and decreasing from the maximum width to a tail section of the first section; and
  (ii) a second section coupled to the first section and having a width which varies along the axis, the width increasing from a leading edge of the second section to a maximum width and decreasing from the maximum width to a stern of the hull; and
 (b) a plurality of bladders are disposed within the hull, the bladders adapted to hold the lifting medium therein, wherein each of the bladders are elongate in shape and have a height, a width, and a central axis intersecting the center of the bladder, wherein each central axis is oriented parallel with the length of each bladder and is inclined relative to the axis, wherein the first section contains at least a first bladder located in front of a second bladder, and wherein the second section contains at least a third bladder located in front of a fourth bladder and a fifth bladder located behind the fourth bladder, wherein the width of the first bladder is equal to the height of the first bladder divided by a number between about 3.3 and about 6.7, wherein the width of the second bladder is equal to the width of the first bladder divided by a number between about 1.5 and about 2.5, plus a number between a range of about one to about three inches.

2. The airship of claim 1, wherein a width of the hull varies along the axis and remains substantially constant along a height of the hull.

3. The airship of claim 1, wherein a maximum width of the hull is equal to a height of the hull divided by a number between about 3.3 and about 6.7.

4. The airship of claim 1, wherein each of the bladders are cylindrical in shape.

5. The airship of claim 1, wherein the central axes of the bladders are oriented substantially perpendicular to the axis.

6. The airship of claim 1, wherein the width of the second bladder is equal to the width of the first bladder multiplied by a number between about 0.5 and about 0.7.

7. The airship of claim 1, wherein the width of the second bladder is equal to the width of the first bladder multiplied by a number between about 0.6 and about 0.9.

8. The airship of claim 1, wherein the width of the third bladder is equal to the height of the third bladder divided by a number between about 3.3 and about 6.7.

9. The airship of claim 8, wherein the width of the fourth bladder is equal to the width of the third bladder divided by a number between about 1.5 and about 2.5.

10. The airship of claim 8, wherein the width of the fifth bladder is equal to the width of the third bladder divided by a number between about 3.5 and 4.5.

11. The airship of claim 1, wherein the width of the first bladder is equal to the height of the first bladder divided by a number between about 3.3 and about 6.7, wherein the width of the second bladder is equal to the width of the first bladder divided by a number between about 1.5 and about 2.5, plus about one to about three inches, wherein the width of the third bladder is equal to the height of the third bladder divided by a number between about 3.3 and about 6.7, wherein the width of the fourth bladder is equal to the width of the third bladder divided by a number between about 1.5 and about 2.5, and wherein the width of the fifth bladder is equal to the width of the third bladder divided by a number between about 3.5 and 4.5.

12. The airship of claim 1, further comprising a propulsion source coupled to the hull and adapted to generate a thrust about a thrust axis, wherein the propulsion source is gimbaled such that the thrust axis may pivot.

13. The airship of claim 1, further comprising a spinner thruster coupled to the hull and adapted to generate a thrust about a thrust axis, wherein the spinner thruster is gimbaled such that the thrust axis may pivot, and wherein the spinner thruster is spaced from a center of mass of the airship.

14. An airship for conveyance through a fluid medium, the airship comprising:
 (a) a hull adapted to contain a lifting medium therein, wherein the hull comprises:
  (i) a first section having a width which varies along an axis extending longitudinally through the hull, the width increasing from a bow of the hull to a maximum width and decreasing from the maximum width to a tail section of the first section; and (ii) a second section coupled to the first section and having a width which varies along the axis, the width increasing from a leading edge of the second section to a maximum width and decreasing from the maximum width to a stern of the hull; and (b) a plurality of bladders are disposed within the hull, the bladders adapted to hold the lifting medium therein, wherein each of the bladders are elongate in shape and have a height, a width, and a central axis intersecting the center of the bladder, wherein each central axis is oriented parallel with the length of each bladder and is inclined relative to the axis, wherein the first section contains at least a first bladder located in front of a second bladder, and wherein the second section contains at least a third bladder located in front of a fourth bladder and a fifth bladder located behind the fourth bladder, wherein the width of the third bladder is equal to the height of the third bladder divided by a number between about 3.3 and about 6.7, wherein the width of the fourth bladder is equal to the width of the third bladder divided by a number between about 1.5 and about 2.5.

15. An airship for conveyance through a fluid medium, the airship comprising:

(a) a hull adapted to contain a lifting medium therein, wherein the hull comprises:

(i) a first section having a width which varies along an axis extending longitudinally through the hull, the width increasing from a bow of the hull to a maximum width and decreasing from the maximum width to a tail section of the first section; and (ii) a second section coupled to the first section and having a width which varies along the axis, the width increasing from a leading edge of the second section to a maximum width and decreasing from the maximum width to a stern of the hull; and (b) a plurality of bladders are disposed within the hull, the bladders adapted to hold the lifting medium therein, wherein each of the bladders are elongate in shape and have a height, a width, and a central axis intersecting the center of the bladder, wherein each central axis is oriented parallel with the length of each bladder and is inclined relative to the axis, wherein the first section contains at least a first bladder located in front of a second bladder, and wherein the second section contains at least a third bladder located in front of a fourth bladder and a fifth bladder located behind the fourth bladder, wherein the width of the third bladder is equal to the height of the third bladder divided by a number between about 3.3 and about 6.7, wherein the width of the fifth bladder is equal to the width of the third bladder divided by a number between about 3.5 and 4.5.

* * * * *